United States Patent Office 3,118,885
Patented Jan. 21, 1964

3,118,885
PROCESS FOR PREPARING 6-AMINO-7-LOWER-ALKYLAMINO - 1,4 - BENZOTHIAZINE - 3 - ONE COMPOUNDS
Ulo Vahtra, San Jose, Calif., assignor to International Business Machines Corporation, New York, N.Y., a corporation of New York
No Drawing. Filed Dec. 30, 1960, Ser. No. 79,540
1 Claim. (Cl. 260—243)

My invention relates to photographically useful salts, and, more particularly, to a process for the preparation of diazonium salts having the structural formula

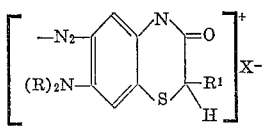

wherein R is methyl, ethyl or propyl; $R^1$ is hydrogen, methyl, ethyl, or propyl and X is a complex forming negative ion.

German Patent 763,721 discloses the process for the preparation of a compound coming within the above set out structural formula. The procedure utilized in this process is lengthy. The yields from such a complex process are understandably low and the cost of the salts produced is, as a result, high.

I have now discovered a simplified process for the preparation of the above identified diazonium salts which results in increased yields and reduces considerably the time required to prepare these compounds. Essentially, my new process comprises reacting 2,4-dinitro-1,5-dichlorobenzene, obtained by nitration of m-dichlorobenzene, with a lower dialkylamine in the presence of a base to form a 2,4-dinitro-5-dialkylamino chlorobenzene, reacting this compound with a 2-mercaptocarboxylic acid to form a 2-(2,4-dinitro-5-dialklaminophenyl) thiocarboxylic acid, reducing the 2- and 4-nitro radicals and cyclizing the acid with the 2-amino radical formed to obtain a 6-amino-7-dialkylamino-3-oxobenzo-1, 4-thiazine which is then diazotized. The diazo hydrochloride is reacted with an appropriate stabilizing salt or negative ion to produce the desired diazonium salt.

The lower dialkylamines which are reacted with 2,4-dinitro-1,5-dichlorobenzene are those dialkylamines having 1–3 carbon atoms in each alkyl radical. Examples of such amines include dimethylamine, methylethylamine, methylpropylamine, diethylamine, and dipropylamine. Bases which are used in the amination are weak bases and include compounds such as sodium bicarbonate, sodium acetate, sodium carbonate, potassium carbonate, and calcium carbonate. The amination reaction is carried out at temperatures of from about 30 to about 100° C., and preferably, at temperatures of from about 60 to about 80° C. Generally, the amination step requires from about ½ to about 2 hours to complete. Solvents for the amination step include polar solvents such as the lower alkyl alcohols.

The substitution of the thiocarboxylic acid for the 1-chloro radical is carried out in a polar solvent, such as methanol, at temperatures of about 60 to about 100° C. Preferably, temperatures on the order of about 70° C. are utilized. Mercapto acids which can be used in the substitution step include mercaptoacetic acid, 2-mercaptopropionic acid, 2-mercaptobutyric acid and 2-mercaptopentanoic acid. The addition of the thiocarboxylic acid requires from about 1 to about 4 hours. The 2-(2,4-dinitro-5-dialkylaminophenyl) thiocarboxylic acid is separated from the solvent, preferably by evaporation under vacuum. The acid can be separated and purified by precipitation of the free acid in water solution and recrystallization in lower aliphatic alcohols.

After separation of the thiocarboxylic acid, the nitro radicals of the thio acid are reduced to form amine radicals. While good reductions can be obtained through catalytic procedures, I have found that desired results are obtained by reducing the nitro radicals with nascent hydrogen from a mixture of a metal, such as tin or zinc, and an acid, such as sulfuric or hydrochloric acid. The reduction is carried out at temperatures of from about 90° C. to about 100° C. On reduction of the 2-nitro radical, cyclization occurs between the amine radical and the carboxyl radical to form the 1,4-thiazine.

After the reduction step is completed, the mixture is purified by the usual means. For example, good results are obtained by treating the hot reaction mixture with charcoal and filtering to obtain a substantially pure solution of the amine-hydrochloride salt. A strong base, such as sodium or potassium hydroxide, can be utilized to precipitate the free amine. The amine can be further purified by recrystallization from various organic solvents, for example, ethanol.

The free 6-amine is diazotized by the usual procedures. For example, the amine can be dissolved in an aqueous solution of an alkali metal nitrite and a mineral acid added to cause diazotization of the 6-amine radical.

An appropriate salt is formed by addition of an appropriate complexing acid or salt to a solution of the diazonium compound. Examples of such salts and acids include fluoboric acid, zinc chloride, tin chloride, etc.

The following examples more fully illustrate my invention. It is not intended that my invention be limited to the exact composition shown, or the exact procedures utilized. It is intended that all equivalents obvious to those skilled in the art be included within the scope of my invention as claimed.

Example I

A mixture of 114 gm. of 2,4-dinitro-1,5-dichlorobenzene and 170 gm. of sodium bicarbonate in 1250 ml. of methanol was brought to reflux and 68 gm. of 33% dimethylamine, in water, added slowly. After two hours, 89 gm. of mercaptoacetic acid and 200 ml. of water were slowly added to the refluxing mixture. After refluxing for two more hours, the solvent was evaporated under vacuum and the residue taken up in 1500 ml. water. Concentrated hydrochloric acid, 850 ml., and 200 gm. of tin were added to the aqueous solution and the mixture brought to a boil. At the completion of the reduction, the liquid reaction mixture was treated with charcoal and filtered while hot. Sodium hydroxide, 870 gm., and 1750 ml. water were added and the precipitate filtered. The precipitate was dissolved in three liters of ethanol and filtered. The solvent was boiled down and the compound crystallized by cooling. The yield of 6-amino-7-dimethylamino-3-oxo-2,4-dihydrobenzo-1,4-thiazine had a melting point of 228° C.

Example II 6-amino-7-dimethylamino-3 - oxo - 2,4 - dihydrobenzo-1,4-thiazine, 25 gm., was dissolved in 50 ml. concentrated hydrochloric acid and 250 ml. water. The solution was cooled in ice bath and a solution of 8 gm. sodium nitrite in 50 ml. water added. After 15 minutes 50 ml. of 45% fluoboric acid was added and the solution kept cold for one hour. The precipitate was filtered and dissolved in acetonitrile to which 10 ml. fluoboric acid was added. On slow addition of ether, crystals were formed which were filtered and dried in vacuum over calcium chloride. The yield of 7-dimethylamino-3-oxo-2,4-dihydrobenzo-1,4-thiazine-6-diazonium fluoborate, 26 gm., has an absorbancy index of 360 mu.

Example III

To prepare 7-diethylamino-3-oxo-2,4-dihydrobeno-1,4-thiazine-6-diazonium fluoborate, diethylamine is substituted for dimethylamine and the general procedure of Example I is followed.

Example IV

Following the procedure of Example I, the compound 7-dimethylamino-3-oxo-2-methyl-2,4 - dihydrobenzo - 1,4-thiazine-6-diazonium fluoborate is prepared by substitution of 2-mercaptopropionic acid for 2-mercaptoacetic acid.

Example V

A zinc chloride salt is formed by introducing slowly purified diazonium compound formed by the process of Example I into an aqueous hydrochloric acid solution containing an equivalent amount of zinc chloride.

Now, having described my invention, I claim:

A process for preparing the compound having the structural formula:

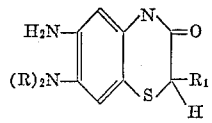

where R is selected from a group consisting of methyl, ethyl and propyl and $R^1$ is selected from the group consisting of hydrogen, methyl and propyl; the steps comprising: reacting 2,4-dinitro-1,5-dichlorobenzene with di-lower alkylamine at a temperature of from about 30° to about 80° C. and in the presence of a weak base capable of accepting hydrogen chloride; reacting the formed 2,4-dinitro-5-dialkyamino chlorobenzene with 2-mercapto lower alkane monocarboxylic acid at a temperature of from about 60° to about 100° C.; and reducing the nitro substituents by nascent hydrogen from a concentrated acid by a metal, the reduction being carried out in an aqueous solution at temperatures of from about 90° to about 100° C.

References Cited in the file of this patent

UNITED STATES PATENTS 2,041,697     Coffey et al. _____ May 26, 1936

OTHER REFERENCES

Unger et al.: Berichte, vol. 30, pages 2393–96 (1897).
Mayer et al.: Berichte, vol. 56, pages 1415–23 (1923).
Mackie et al.: Jour. Amer. Chem. Soc. (London), 1952, pp. 787–790.
Sidgwick: Organic Chem. of Nitrogen, 1937, p. 13.